US011942000B1

(12) United States Patent
Levy et al.

(10) Patent No.: US 11,942,000 B1
(45) Date of Patent: Mar. 26, 2024

(54) FLAG LIGHTING SYSTEMS ATTACHABLE TO FLAGPOLES

(71) Applicant: OneNation Flag, LLC, Wynnewood, PA (US)

(72) Inventors: Arthur N. Levy, Wynnewood, PA (US); Orlando J. Hernandez, Ewing, NJ (US); Brian Orme, Phoenixville, PA (US)

(73) Assignee: OneNation Flag, LLC, Wynnewood, PA (US)

( * ) Notice: Subject to any disclaimer, the term of this patent is extended or adjusted under 35 U.S.C. 154(b) by 0 days.

(21) Appl. No.: 18/150,837

(22) Filed: Jan. 6, 2023

Related U.S. Application Data

(60) Provisional application No. 63/300,282, filed on Jan. 18, 2022.

(51) Int. Cl.

| | |
|---|---|
| ***G09F 13/30*** | (2006.01) |
| ***F21S 9/03*** | (2006.01) |
| ***F21V 7/06*** | (2006.01) |
| ***G09F 13/16*** | (2006.01) |
| ***G09F 17/00*** | (2006.01) |
| *F21W 131/10* | (2006.01) |

(Continued)

(52) U.S. Cl.
CPC .............. *G09F 13/30* (2013.01); *F21S 9/037* (2013.01); *F21V 7/06* (2013.01); *G09F 13/165* (2013.01); *G09F 17/00* (2013.01); *F21W 2131/10* (2013.01); *F21Y 2103/10* (2016.08); *F21Y 2115/10* (2016.08); *G09F 2017/005* (2013.01)

(58) Field of Classification Search
CPC ........ G09F 13/30; G09F 13/165; G09F 17/00; F21S 9/037; F21V 7/06
See application file for complete search history.

(56) References Cited

U.S. PATENT DOCUMENTS 1,171,917 A * 2/1916 Axford .................. F21V 33/00 116/173
6,955,456 B2 * 10/2005 Schroeder ............... G09F 17/00 362/253

(Continued)

FOREIGN PATENT DOCUMENTS

DE 3918169 A1 * 11/1990
DE 3918169 A1 * 11/1990

*Primary Examiner* — Evan P Dzierzynski
*Assistant Examiner* — Nathaniel J Lee
(74) *Attorney, Agent, or Firm* — Rogowski Law LLC

(57) ABSTRACT

A lighting attachment for a flagpole includes at least one reflector that directs light from a light source to illuminate front and rear faces of the flag. In one embodiment, the reflector has at least one concavely dished parabolic surface. In another embodiment, the reflector is held in a sleeve that rotates about the flagpole in response to flag movement. In still another embodiment, a swivel connector is fastened to the top of the flagpole and a lower lighting unit to illuminate a flag is rotatably engaged around the flagpole. In yet another embodiment, a rotatable flag bracket is held in an outer groove of a sleeve of the finial attachment, and a finial globe is illuminated by a light source. The housing for the lighting attachment and/or the finial attachment may include at least one power source, such as solar panels and associated energy accumulators (e.g., batteries).

30 Claims, 12 Drawing Sheets

(51) Int. Cl.
*F21Y 103/10* (2016.01)
*F21Y 115/10* (2016.01)

(56) References Cited

U.S. PATENT DOCUMENTS

| | | | | |
|---|---|---|---|---|
| 7,434,971 | B1 * | 10/2008 | Wang | G09F 17/00 362/431 |
| 8,057,078 | B1 * | 11/2011 | Ko | G09F 23/04 362/253 |
| 8,215,807 | B1 | 7/2012 | Brunesti | |
| 11,035,565 | B1 | 6/2021 | Levy | |
| 2004/0134411 | A1 | 7/2004 | Lawrence | |
| 2005/0083693 | A1 * | 4/2005 | Garrett | G09F 17/00 362/276 |
| 2008/0013306 | A1 | 1/2008 | Guilmette | |
| 2012/0113625 | A1 * | 5/2012 | Werner | F21K 9/20 362/183 |
| 2012/0314404 | A1 | 12/2012 | Harshaw | |
| 2016/0348863 | A1 | 12/2016 | Toner | |
| 2017/0152998 | A1 | 6/2017 | Toner | |
| 2018/0013306 | A1 | 1/2018 | Tkachenko | |
| 2019/0360650 | A1 | 11/2019 | Toner | |
| 2020/0116319 | A1 | 4/2020 | Gallo, Jr. | |

* cited by examiner

FLAG LIGHTING SYSTEMS ATTACHABLE TO FLAGPOLES

FIELD OF THE INVENTION

The present invention is generally directed to lighting attachments for a flagpole, which engage with the flagpole (or are integrally formed with the flagpole) and illuminate a flag mounted to the flagpole with light sources in combination with reflectors to direct light onto a flag suspended from the flagpole.

BACKGROUND OF THE INVENTION

The US Flag Code requires that the United States flag be illuminated when such flag is displayed at night. Various spotlights have been used for this purpose.

U.S. Pat. No. 11,035,565 shows a flag topper finial assembly that mounts to a flagpole and has a first solar powered LED lighting source that directs light to illuminate the finial and a second solar powered LED lighting source that directs light through a transparent section of the finial base to illuminate a flag affixed to the flagpole below the finial assembly.

Improvements to these lighting apparatus continue to be sought. Particularly desired are lighting solutions with ornamental appeal.

BRIEF SUMMARY OF THE INVENTION

In a first embodiment of the invention, a lighting attachment for a flagpole has a housing having a top and a bottom. The housing defines an inner channel configured to receive at least a portion of a length of the flagpole. The flagpole can be held at one end by a bracket to a wall or column surface, and has a top end that extends away from the wall or column surface. The lighting attachment either is integrally formed with the flagpole or is secured to the flagpole along the flagpole length, generally at or near the top end of the flagpole.

The lighting attachment includes a reflector seated in the housing or arranged on the top of the housing. The reflector has a first concavely dished surface and a second concavely dished surface, with the first concavely dished surface disposed to one side of the flagpole and the second concavely dished surface disposed to another side of the flagpole, which flagpole is disposed in the housing. The reflector may be a double parabolic reflector or a hyperbolic paraboloid. At least one light source is disposed on a surface of the reflector. Preferably, at least one light source is disposed on the first concavely dished surface of the reflector, and at least one light source is disposed on the second concavely dished surface of the reflector. The light source(s) may be LED light sources. The light sources are powered by energy accumulators, such as one or more batteries. Alternatively, the light sources may be powered by electricity from another source, such as via electrical connection to a building's electricity. In an advantageous embodiment, at least one solar panel is disposed on the top of the housing and is operatively connected with the energy accumulator(s) to power the at least one light source. The reflector directs light away from the flagpole and onto a front face and a rear face of a flag suspended from the flagpole.

A finial attachment may be joined to the top of the flagpole. A second light source disposed in or on the housing is operatively connected to the energy accumulator to power the second light source to illuminate a globe portion of the finial attachment. Alternatively, the second light source may be powered by electricity from another source, such as via electrical connection to a building's electricity.

The flag may be attached to revolving brackets that are rotatably joined to the flagpole. The revolving brackets are connectable to a flag either directly, or alternatively indirectly with fasteners. Fasteners, such as clips or rings, may be used to join the flag (at grommets provided in the flag tape) to the brackets. The first revolving bracket may be joined to the flagpole below a bottom end of the housing and a second revolving bracket may be joined to the flagpole at a distance spaced apart from the first revolving bracket. The second revolving bracket may be positioned between a top end of the housing and the finial attachment.

In a second embodiment of the lighting attachment for a flagpole, the lighting attachment has a housing having a top and a bottom, with the housing defining an inner channel configured to receive a portion of a length of the flagpole. The housing also has a window opening in its bottom that is covered by a lens or window pane disposed over the window opening.

A sleeve has an inner channel configured to receive a portion of a length of the flagpole. The sleeve is rotatable around the flagpole. The sleeve has an upper end and a lower end, and the lower end of the sleeve is attached to or integrally formed with a revolving flag bracket. Although the housing remains fixed with the flagpole held therein, the upper end of the sleeve is rotatably held within the housing. The sleeve is rotatable relative to the flagpole in response to movement of a flag attached to the revolving flag bracket. The upper end of the sleeve defines an opening through a sidewall of the sleeve.

A reflector is seated inside the sleeve and is arranged for directing light out of the sleeve through the opening. At least one light source is disposed on a surface of the reflector or on a surface of the flagpole within the sleeve.

Light that emits from the opening of the sleeve also passes out of the housing through the lens of the window opening. Such reflected light is directed onto the front and rear faces of a flag that is suspended from the flagpole. At least one solar panel is disposed on the top of the housing and is operatively connected with an energy accumulator to power the at least one light source.

In this second embodiment, preferably there is a second revolving flag bracket joined to the flagpole and spaced a distance apart from the revolving flag bracket. In an advantageous configuration, the second revolving flag bracket is positioned above the top of the housing, and the revolving brackets are connectable to a flag either directly, or alternatively indirectly with fasteners. In another advantageous configuration, the sleeve is rotatable within said housing, and the housing does not rotate about the flagpole.

A finial attachment may be joined to the top of the flagpole. The finial may include a globe. A second light source may be disposed in or on the housing that is operatively connected to the energy accumulator to power the second light source to illuminate the globe portion of the finial attachment.

In a third embodiment of the invention, a lighting attachment for a flagpole has a swivel connector fastened to the flagpole. The swivel connector defines a portion that is rotatable about a central axis defined by the flagpole.

For the third embodiment, a lower lighting unit is engaged around the flagpole with a portion seated in the swivel connector. The lower lighting unit may be slid over the top portion of the flagpole, and when seated in the swivel connector, the lower lighting unit is rotatable about the flagpole axis. The lower lighting unit may be formed from a tubular sleeve, with a portion cut out from the sidewall to form a channel or window opening in the tubular sleeve. The lower lighting unit has one or more LED lighting sources secured thereto to direct light radially away from the flagpole. In an advantageous embodiment, the LED lighting sources are LED light strips or tapes, and the LED light strips or tapes are secured inside the tubular sleeve or on the edges of the channel or window opening of the tubular sleeve.

A revolving truck is seated over a top of the flagpole. The revolving truck has a portion thereof inside the lower lighting unit. The revolving truck has a cantilevered portion extending outwardly and extending outside of the lower lighting unit. A pulley is engaged to the cantilevered portion of the revolving truck. The pulley is configured to receive a halyard for a flag to be flown from the flagpole. Both the lower lighting unit and the revolving truck rotate about the tube axis of the tubular sleeve.

In a particularly advantageous implementation of the third embodiment, a finial attachment is joined to the top of the flagpole. When solar power is used, the finial attachment comprises at least one compartment to support a solar power source, such as one or more solar panels and one or more energy accumulators or batteries. The energy accumulator is operatively connected to the one or more LED lighting sources. The LED lighting sources may comprise one or more LED light strips or tapes. The one or more LED lighting sources direct light radially away from the flagpole, and away from the lower lighting unit to illuminate at least a portion of the flag flown from the flagpole. In addition, an ornament or finial (flag topper) is joined to the finial attachment. The finial attachment caps over the lower lighting unit. The finial may incorporate a light emitter, such as a bulb or one or more LED lighting sources. The energy accumulators or batteries may power both the LED lighting sources of the lower lighting unit as well as the light emitter of the finial. Alternatively, the LED light sources may be powered by electricity from another source, such as via electrical connection to a building's electricity.

A flag is secured to the halyard of the third embodiment of the invention, such as by clips, and the halyard operatively connects to the pulley. The flag may be raised by pulling on one side of the halyard cord or rope, placing the flag adjacent to the lower lighting unit. As the lower lighting unit rotates or swivels about the flagpole, the flag tacks this same movement due to its halyard connection to the revolving truck. The LED lighting sources direct light radially away from the lower lighting unit and onto the flag.

In a fourth embodiment of the invention, a lighting attachment for a flagpole has a finial attachment with a housing and a sleeve depending from the housing. The sleeve is configured to be removably joined to the top of a flagpole. The sleeve may be tubular, and a portion of the inside wall of such sleeve may include gasket material to frictionally engage with an outside surface of the portion of the flagpole received in the tubular channel of the sleeve. The outer wall of the sleeve defines an outer groove configured to receive a revolving flag bracket. The revolving flag bracket is rotatably held within the outer groove of the sleeve. Preferably, the revolving flag bracket is assembled together with the finial attachment as a unit. A flag to be suspended from the flagpole is joined to the revolving flag bracket, and thereby can rotate about the tubular sleeve as well as the flagpole to which the tubular sleeve of the finial attachment is joined.

The lighting attachment further includes a globe that extends from and is supported by the finial attachment. The globe may be formed of a clear or translucent polymeric material so that such globe emits light therefrom. One or more LED lighting sources to illuminate the globe may be held within the housing of the finial attachment.

In the fourth embodiment, the housing has at least one compartment in an outer wall to support a solar power source, such as one or an array of solar panels. The solar panels are operatively connected to at least one energy accumulator, such as a battery, and the energy accumulator in turn is operatively connected to the one or more LED lighting sources. The energy accumulator may be held within the housing.

In the various embodiments of the lighting attachments according to the invention, a light sensor may be deployed in conjunction therewith to sense ambient light and activate a switch associated with the one or more LED lighting sources. For example, the light sensor can be set to activate the switch for the LED lighting sources in dusk or nighttime conditions to illuminate the globes and/or the flags. Optionally, in addition, the light sensor can be set to deactivate the switch to the LED lighting sources in daylight conditions.

BRIEF DESCRIPTION OF THE DRAWINGS

The foregoing summary, as well as the following detailed description of the disclosure, will be better understood when read in conjunction with the appended drawings. For the purpose of illustrating the disclosure, there are shown in the drawings embodiments of lighting attachments for a flagpole which are presently preferred. It should be understood, however, that the disclosure is not limited to the precise arrangements and instrumentalities shown. In the drawings.

DETAILED DESCRIPTION

Figure 1:
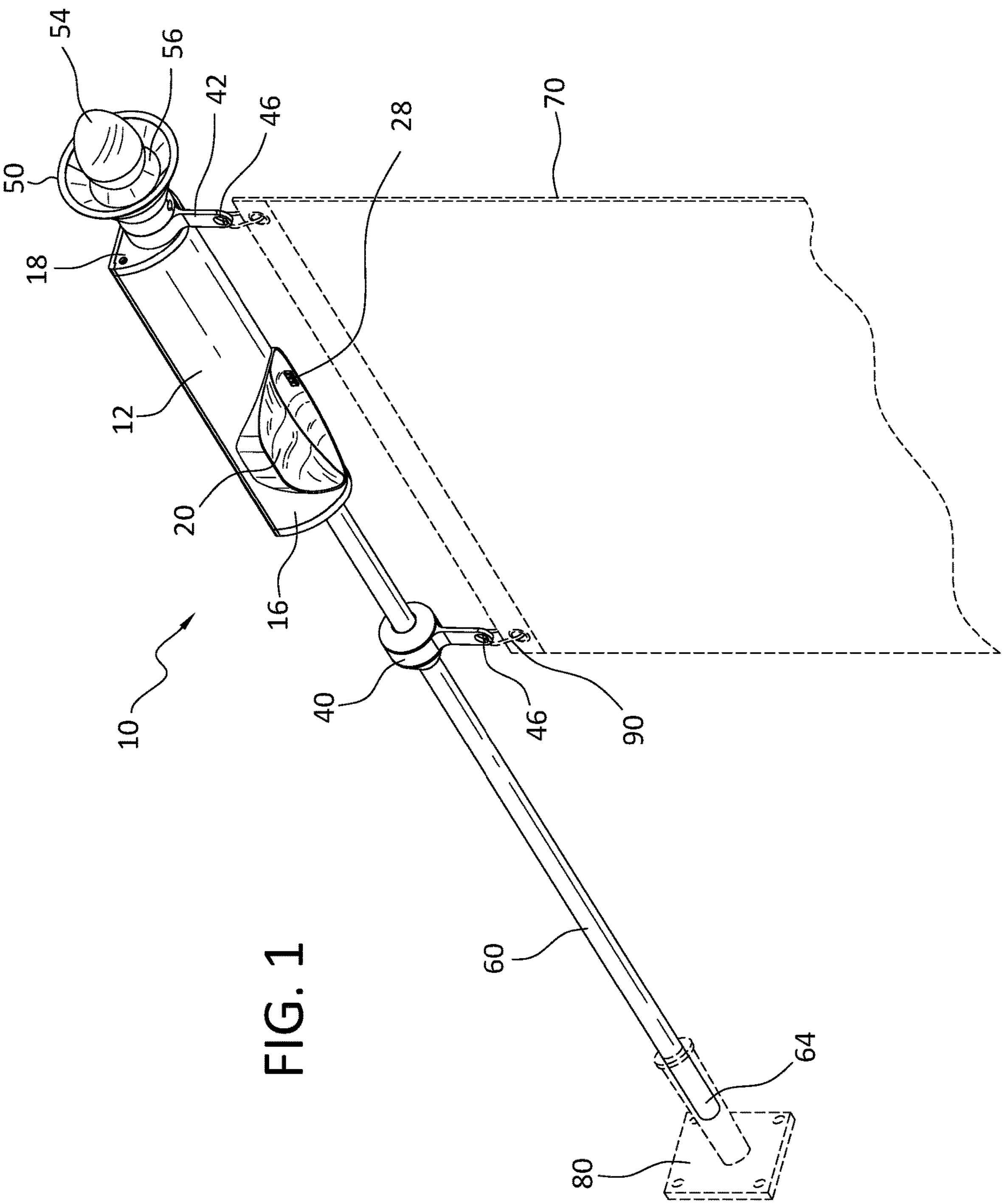
FIG. 1 is a bottom perspective view of a flag lighting attachment for a flagpole according to a first embodiment of the invention in combination with a flagpole.

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The present invention will be described in detail by way of example with reference to the attached drawings. Throughout this description, the preferred embodiments and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s). The following description is provided to enable any person skilled in the art to make and use the invention and sets forth the best modes contemplated by the inventors of carrying out their invention. Various modifications, however, will remain readily apparent to those skilled in the art without departing from the spirit and scope of the invention, which is defined by the accompanying claims.

It should be noted that steps recited in any method claims below do not necessarily need to be performed in the order in which they are recited. Those of ordinary skill in the art will recognize variations in performing the steps from the order in which they are recited. In addition, the lack of mention or discussion of a feature, step or component provides the basis for claims where the absent feature or component is excluded by way of a proviso or similar claim language.

Referring to FIGS. 1-6, a first a lighting attachment 10 for a flagpole 60 of the present invention has a housing 12 having a substantially planar top surface 14 and a convexly curved bottom surface 16. The housing 12 defines an inner channel 13 (see FIG. 6) configured to receive at least a portion of a length of the flagpole 60. A first end cap 17 closes the open bottom end of the housing 12. A second end cap 18 closes the open top end of the housing 12. The flagpole 60 is threaded through holes formed in the first end cap 17 and second end cap 18. In this first embodiment of the lighting attachment 10, preferably the housing 12 remains in a fixed position with the convexly curved bottom surface 16 facing outwardly, away and downwardly from the flagpole 60, and the top surface 14 facing outwardly, away and upwardly from the flagpole 60 when the lighting attachment 10 is secured to the flagpole 60.

The lighting attachment 10 includes a reflector 20 seated in the housing 12 or arranged on the bottom of the housing 12. In the embodiment shown in FIGS. 1-6, the reflector 20 has a first concavely dished surface 22 and a second concavely dished surface 24 (see FIG. 2), with the first concavely dished surface 22 disposed to one side of the flagpole 60 and the second concavely dished surface 24 disposed to another side of the flagpole 60 when the flagpole 60 is received in the housing 12. In the embodiment depicted, the opposite surface of the reflector 20, which opposite surface is inside the chamber defined by the housing 12, partially wraps about a portion of the length of the flagpole 60 held inside the lighting attachment 10. Each of the concavely dished surfaces 22, 24 are recessed and form parabolic reflectors to direct light out of the housing and toward a flag 70 secured to the flagpole 60. As alternative structure, for example, the reflector 20 may be a double parabolic reflector or a hyperbolic paraboloid. The reflector 20 directs light away from the flagpole 60 and onto a front face and a rear face of a flag 70 suspended from the flagpole 60.

Figures 2, 3:
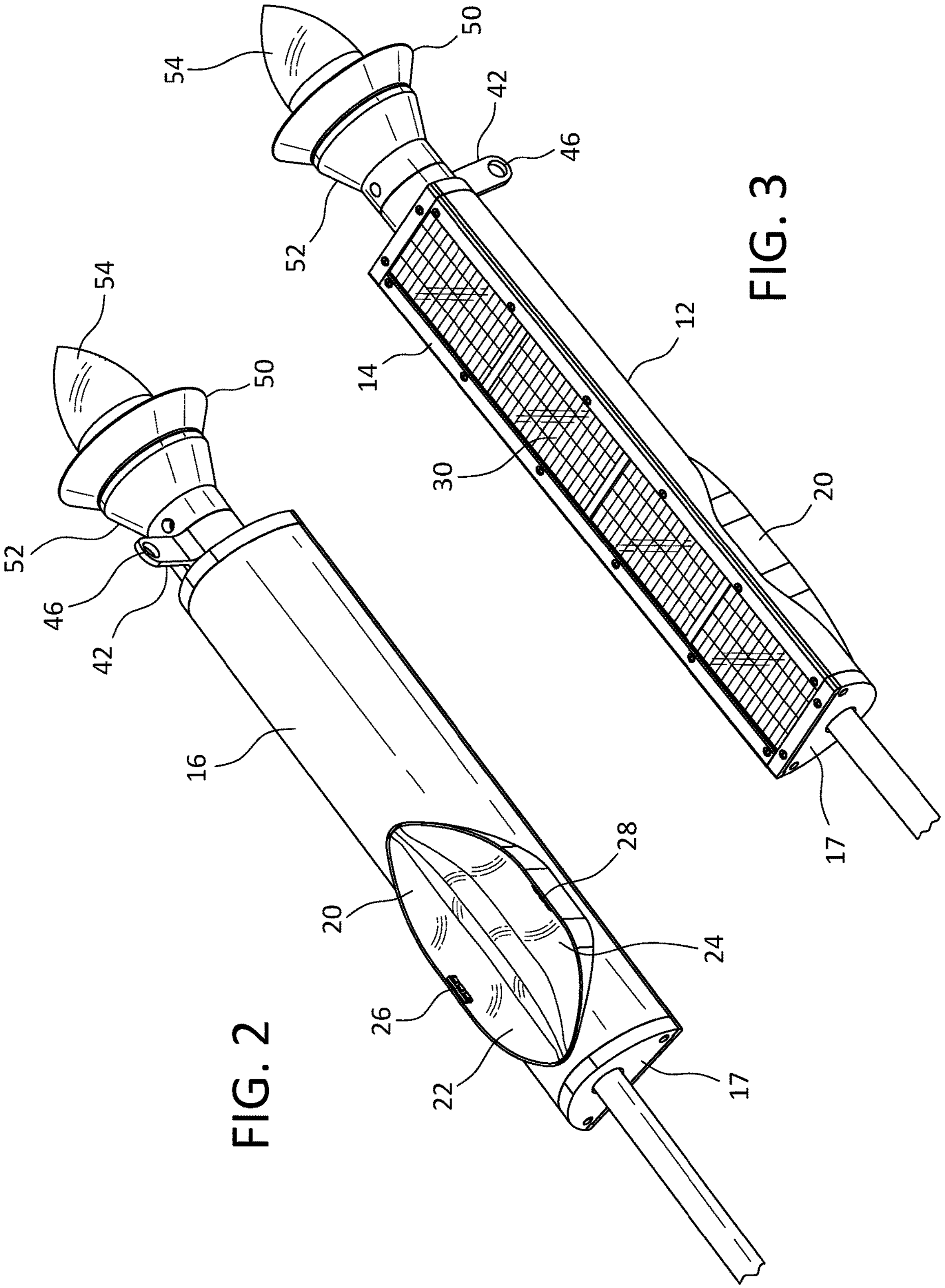
FIG. 2 is a bottom perspective view of the flag lighting attachment of FIG. 1 in combination with the flagpole.
FIG. 3 is a top perspective view of the flag lighting attachment of FIG. 1.
Figure 4:
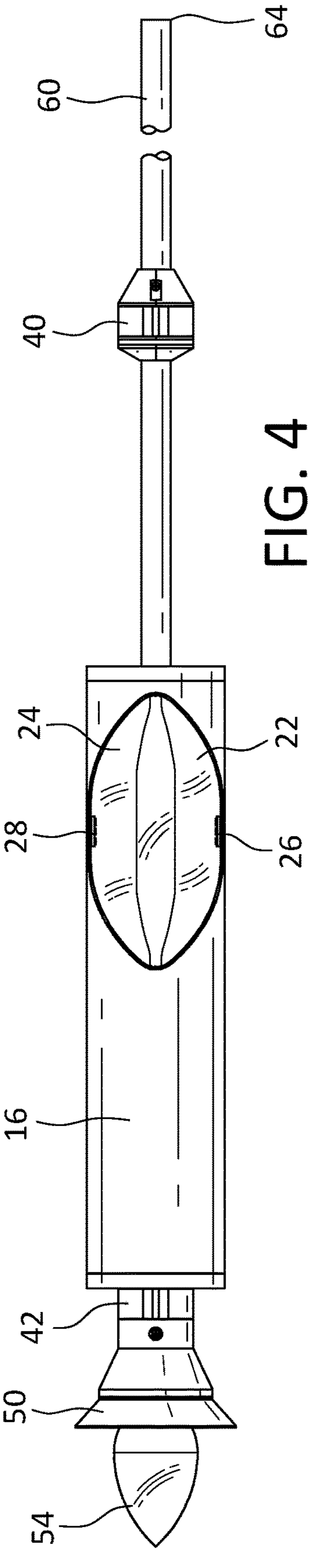
FIG. 4 is a bottom view of the flag lighting attachment of FIG. 1.
Figure 5:
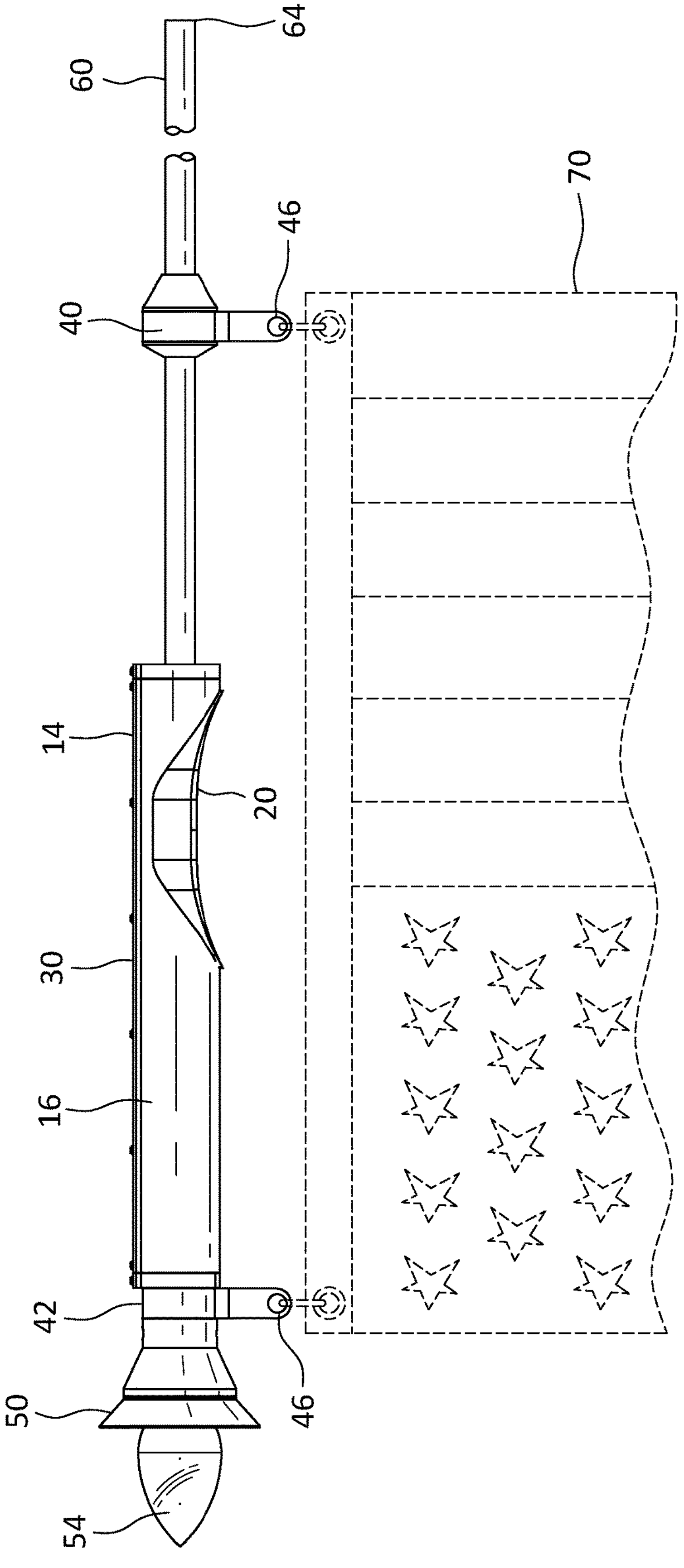
FIG. 5 is a left side elevational view of the flag lighting attachment of FIG. 1 in combination with a flagpole and showing a flag suspended therefrom.

At least one light source 26, 28 is disposed on a surface of the reflector 20. Preferably, the at least one light source 26 is disposed on or in the first concavely dished surface 22 of the reflector 20, and the at least one other light source 28 is disposed on or in the second concavely dished surface 24 of the reflector 20. The light source(s) 26, 28 may be LED light sources. As shown in FIGS. 1, 2 and 4, the LED light sources 26, 28 are disposed on outer walls of the reflector 20 and direct light toward the center of the reflector 20. The light sources 26, 28 may be adhered to the reflector surface, or may be mechanically attached using fastener (e.g. screws) or snap fittings. The light sources 26, 28 are powered by energy accumulator(s) 34, such as one or more batteries. The energy accumulator(s) 34 may be held inside the housing 20. At least one solar panel 30 is disposed on the top surface 14 of the housing 12 and is operatively connected with the energy accumulator(s) 34 to power the at least one light source 26, 28. More preferably, as shown in FIG. 3, an array or series of solar panels 30 are held in a compartment formed in the top surface 14 of the housing 12. Wiring from the light sources 26, 28 may be attached to a main PCBA of the lighting attachment 10, which main PCBA may be operatively attached to the energy accumulator(s).

A window 36 or lens may cover the reflector 20. In the embodiment shown in FIGS. 1-6, the reflector 20 is chrome plated plastic. Alternatively, the reflector may be molded of acrylonitrile-butadiene-styrene (ABS), polypropylene (PP) or polycarbonate (PC) or other suitable polymer or composite and coated with a reflective coating. The housing may be fabricated of a polymer such as acrylonitrile-butadiene-styrene (ABS), polycarbonate (PC) or nylon, or other suitable polymer. Some components of the housing may be fabricated of metal, such as aluminum or stainless steel.

Figure 6:
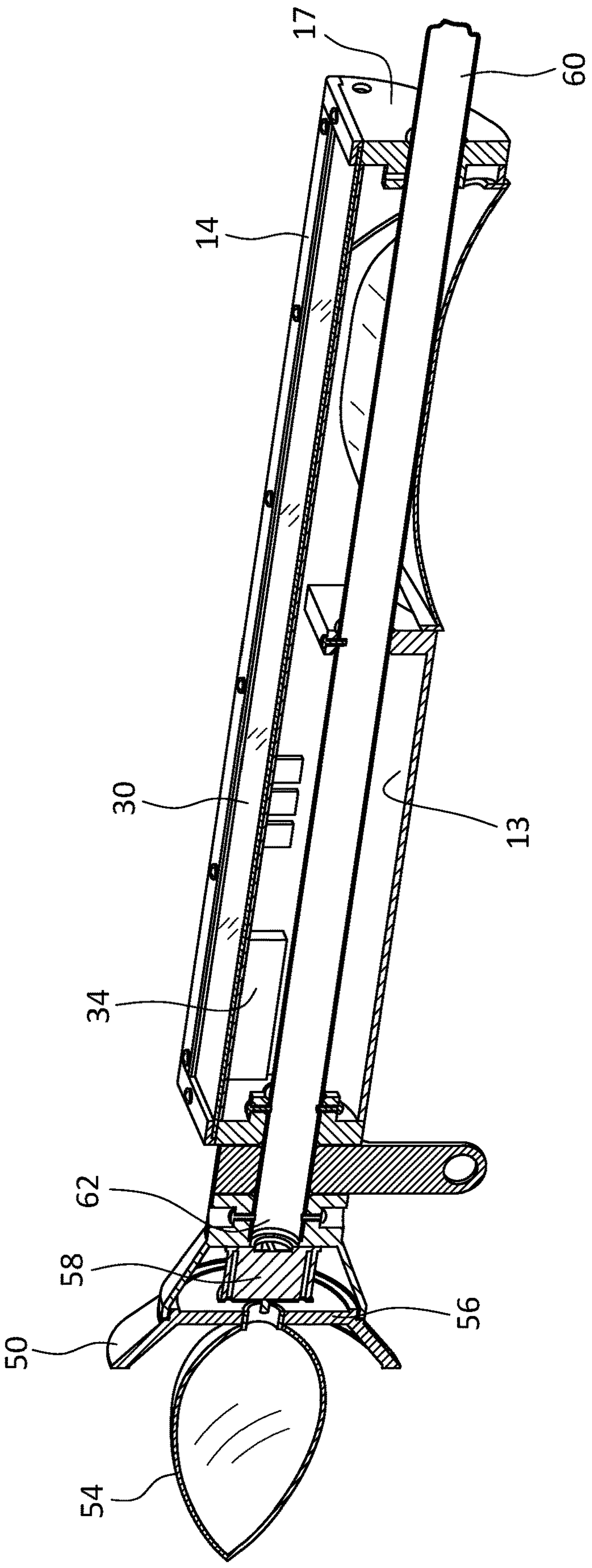
FIG. 6 is a cross-sectional view of the flag lighting attachment of FIG. 1.
Figure 7:
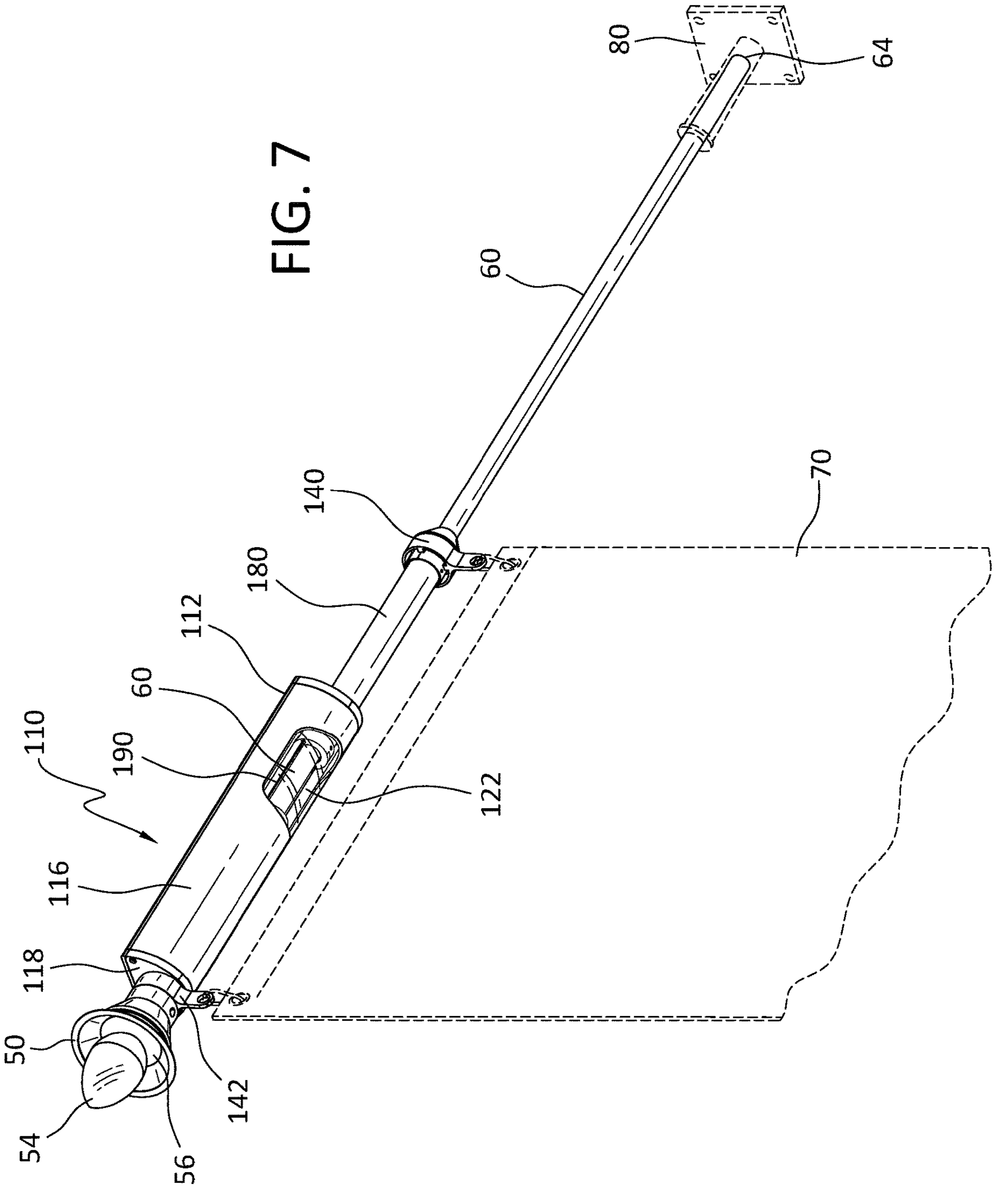
FIG. 7 is a bottom perspective view of a flag lighting attachment for a flagpole with a reflector that is rotatable about a flagpole according to a second embodiment of the invention.

A finial attachment 50 may be joined to the top end 62 of the flagpole 60. The finial attachment 50 has a finial housing 52 with a cup portion 56 configured to receive a globe 54. If desired, the globe 54 of the finial attachment 50 may be illuminated. In such embodiment, a second light source 58 (see FIG. 6) is disposed in or on the finial attachment 50, or alternatively, in or on the housing 12. The second light source 58, shown as an LED light source in FIG. 6, is operatively connected to the energy accumulator 34 to power the second light source 58 to illuminate the globe portion 54 of the finial attachment 50. Harness wiring for the LED light source to the globe 54 may be attached to a main PCBA of the lighting attachment 10. Optionally, not shown in FIGS. 1-6, the cup portion 56 of the finial housing 52 may define windows or openings to permit light emitted from the globe 54 to be directed axially downwardly (e.g., direction parallel to the axis of the flagpole 60) toward the lighting attachment 10 and flag 70 that is removably secured to the flagpole 60.

The flag 70 may be attached to revolving brackets 40, 42 that are rotatably joined to the flagpole 60. The revolving brackets 40, 42 are connectable to the flag 60 either directly, or alternatively indirectly. Fasteners 90, such as clips or rings, may be used to join the flag 60 (at grommets provided in the flag tape) to the brackets 40, 42. The first revolving bracket 40 may be joined to the flagpole 60 below the bottom end 17 of the housing 12 of the lighting attachment 10 and a second revolving bracket 42 may be joined to the flagpole 60 at a distance spaced apart from the first revolving bracket 40, and preferably above the top end 18 of the housing 12 of the lighting attachment 10. As shown in FIGS. 1-6, the second revolving bracket 42 may be positioned between a top end 18 of the housing 12 of the lighting attachment 10 and the finial attachment 50.

The flagpole 60 can be held at one end (bottom end 64) by a bracket 80 to a wall or column surface (see FIG. 1), and has a top end 62 that extends away from the wall or column surface. The lighting attachment 10 is secured to the flagpole 60 along the flagpole length, generally at or near the top end 62 of the flagpole 60. The flag 70 is illuminated by light reflected out of the housing 12 of the lighting attachment 10 by the reflector 20. When the flag 70 waves in response to force of wind, the revolving brackets 40, 42 can rotate about the flagpole 60. The concavely recessed portions 22, 24 of the reflector 20 direct the light onto the front and rear surfaces of the flag 70. The reflector 20 is shaped so that the reflected light forms arc patterns that can continue to illuminate the flag to accommodate some flag movement in response to the wind.

In a second embodiment of the lighting attachment 110 for a flagpole 60 of the present invention shown in FIGS. 7-12, the lighting attachment 110 has a housing 112 having a substantially planar top surface 114 and a convexly curved bottom surface 116. The housing 112 defines an inner channel configured to receive a portion of a length of the flagpole 60. The bottom surface 116 of the housing 112 has a window opening 120 that is covered by a lens 122 or window pane disposed over the window opening 120. The housing 112 is joined to the flagpole 60 in a fixed position at or near the top end 62 of the flagpole 60.

A cylindrical sleeve 180 has an inner channel 188 configured to receive a portion of a length of the flagpole 60. The sleeve 180 is rotatable around the flagpole 60. The sleeve 180 has an upper end or top end 182 and a lower end or bottom end 184 (see FIG. 11), and the lower end 184 of the sleeve is attached to or integrally formed with a first revolving flag bracket 140. The first rotatable flag bracket 140 has an extended arm 144 with an opening 146 configured to receive a flag fastener 90. Although the housing 112 remains fixed with the portion of the flagpole 60 held therein, the upper end 182 of the sleeve 180 optionally may be rotatably held within the housing 112. If rotation is desired, the sleeve 180 is rotatable relative to the flagpole 60 (about the axis of the flagpole in the direction of arrow 160 (see FIGS. 8-11)) in response to movement of a flag 70 attached directly or indirectly to the first revolving flag bracket 140.

Figure 8:
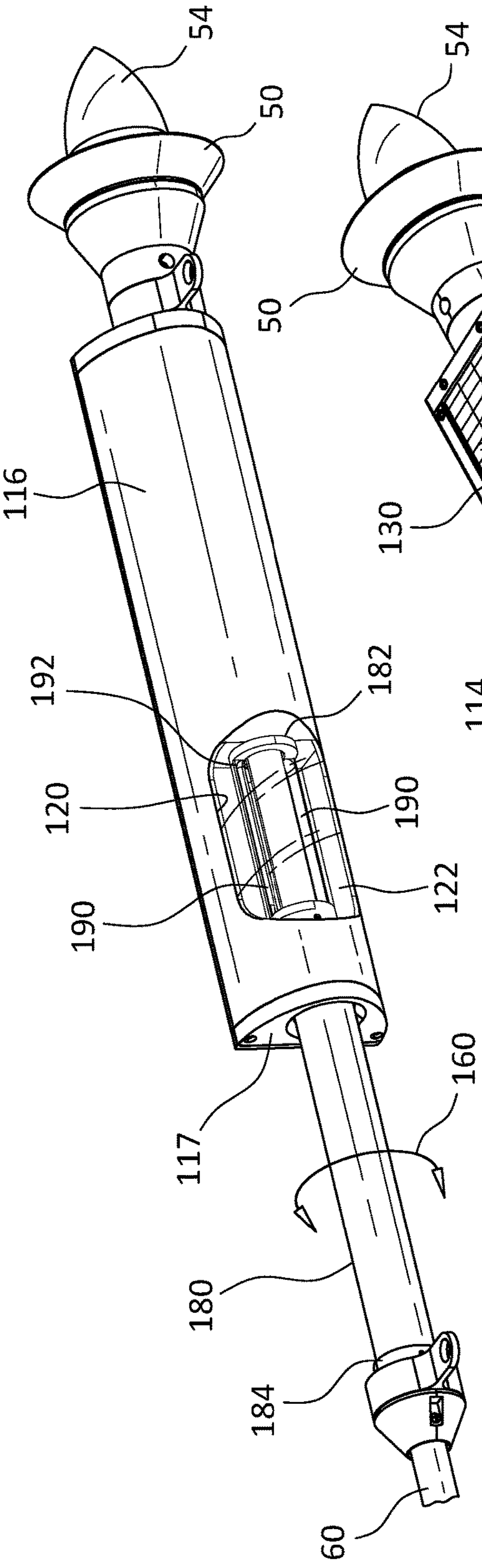
FIG. 8 is a bottom perspective view of the flag lighting attachment of FIG. 7.
Figure 10:
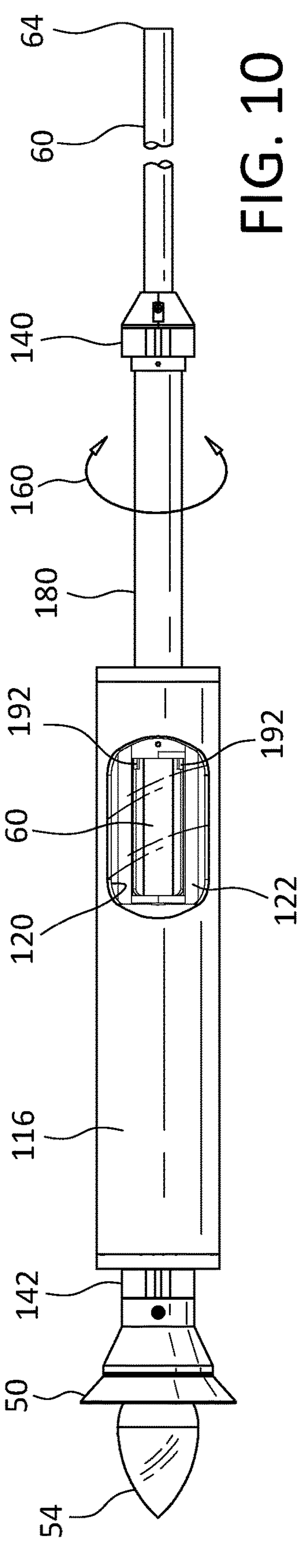
FIG. 10 is a bottom view of the flag lighting attachment of FIG. 7.
Figure 11:
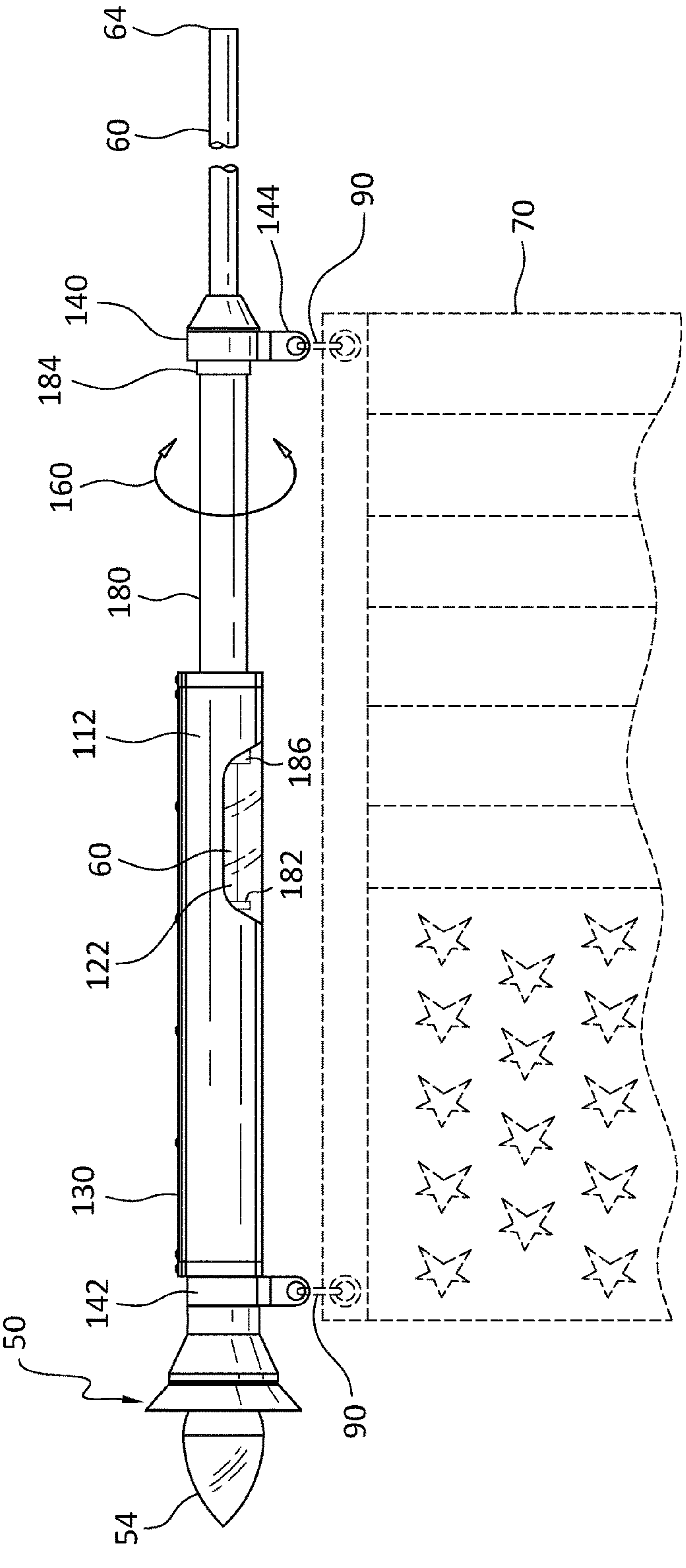
FIG. 11 is a side elevational view of the flag lighting attachment of FIG. 7 in combination with a flagpole and showing a flag suspended therefrom.
Figure 12:
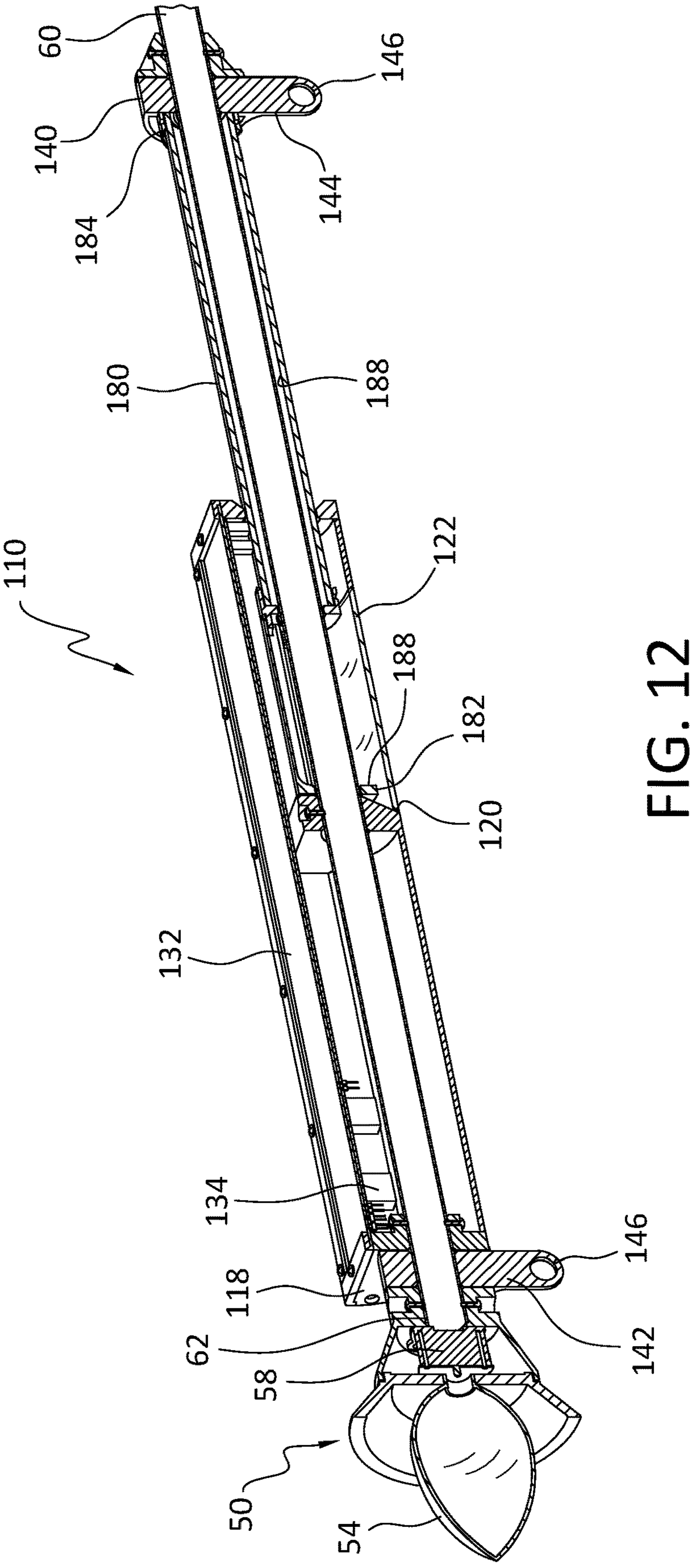
FIG. 12 is a cross-sectional view of the flag lighting attachment of FIG. 7.

The upper end 182 of the sleeve 180 defines an opening or window opening 186 through a sidewall of the sleeve 180. A reflector 190 is seated inside the sleeve 180 and is arranged for directing light past the flagpole 60, out of the sleeve 180 through the opening 186, and through the lens 122 and out of the housing 112. At least one light source 192 (see FIGS. 8 and 10) is disposed on a surface of the reflector 190 or on a surface of the flagpole 60 within the sleeve 180 and at or near the window opening 186 of the sleeve 180. In FIGS. 8 and 10, two LEDs 192 are positioned on the flagpole 60. The reflector 190 is concavely dished and may be attached to or painted or applied onto an inner wall of the cylindrical sleeve 180 and aligned with the window opening 186. The reflector 190 may be formed of chrome plated plastic. Alternatively, the reflector may be molded of acrylonitrile-butadiene-styrene (ABS), polypropylene (PP) or polycarbonate (PC) or other suitable polymer or composite and coated with a reflective coating.

Light emitted from the LEDs 192 is reflected by the reflector 190 and emitted from the opening 186 of the sleeve 180. Such reflected light passes out of the housing 112 through the lens 122 of the window opening 120, and is directed onto the front and rear faces of a flag 70 that is suspended from the flagpole 60.

Figure 9:
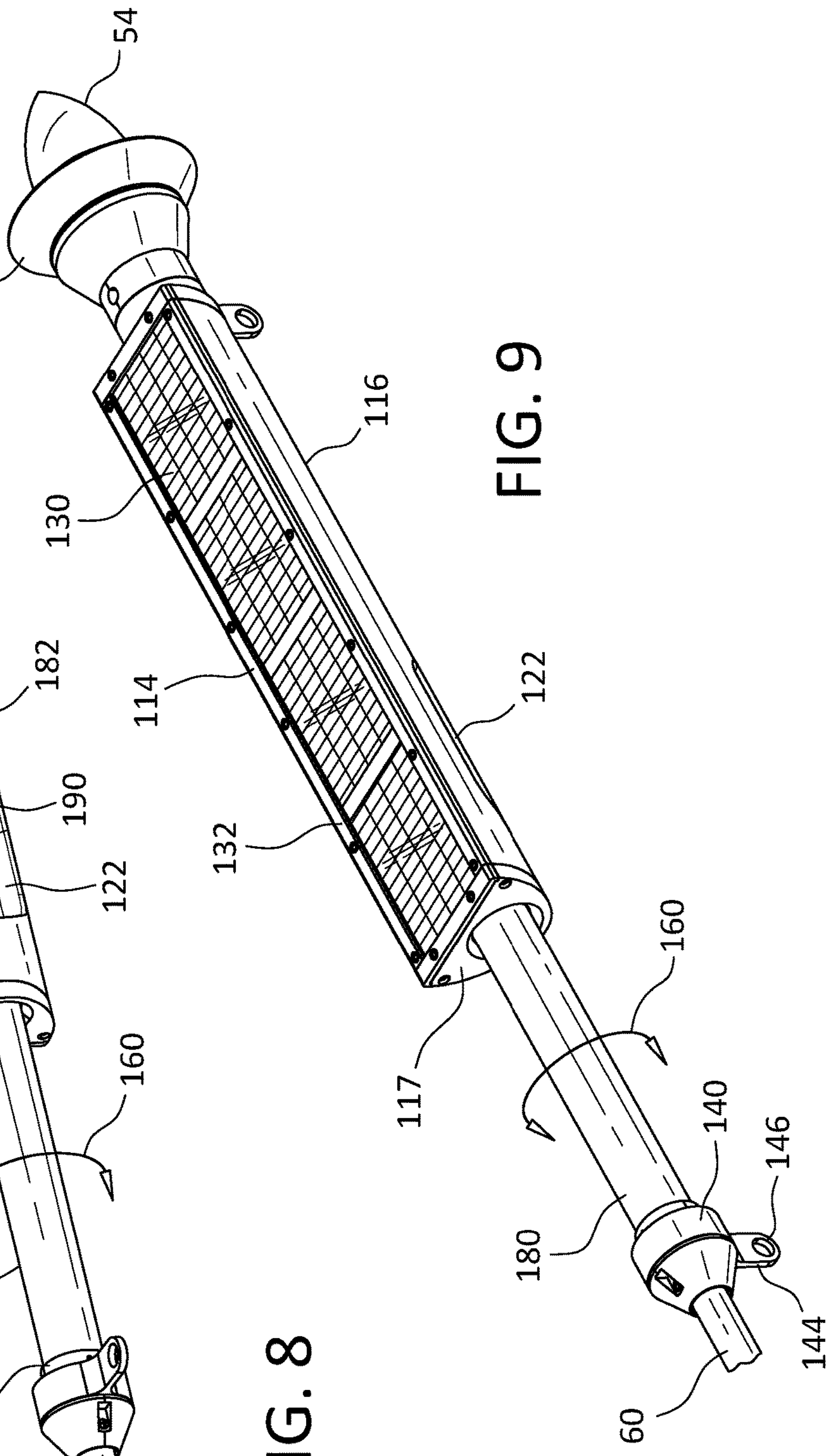
FIG. 9 is a top perspective view of the flag lighting attachment of FIG. 7.

A solar panel array 130 is installed over the top surface 114 of the housing 112 (see FIG. 9). At least one solar panel 130 is disposed on the top 114 of the housing 112 and is operatively connected with an energy accumulator 134, such as a battery, to power the at least one light source 192. The energy accumulator 134 is housed inside the housing 112 of the lighting attachment 110 (see FIG. 12).

In this second embodiment, preferably there is a second revolving flag bracket 142 joined for rotation to the flagpole 60 and spaced a distance apart from the first revolving flag bracket 140. In an advantageous configuration, the second revolving flag bracket 142 is positioned above the upper end 118 of the housing 112, and the revolving brackets 140, 142 are connectable to the flag 70 either directly, or alternatively indirectly, with fasteners 90. In another advantageous configuration, the sleeve 180 is rotatable within said housing 112, and the housing 112 does not rotate about the flagpole 60.

As the flag 70 moves in response to the wind, the revolving flag brackets 140, 142 permit the flag 70 to rotate about the flagpole 60 in either rotational direction indicated by arrow 160. As the flag 70 so rotates, the first rotatable bracket 140 and the cylindrical sleeve 180 also will rotate about the flagpole 60 in either rotational direction indicated by arrow 160. The position of the reflector 190 thus is moved along with the cylindrical sleeve 180. Notwithstanding movement of the flag 70, the lighting attachment 110 keeps directing reflected light emitted from the window of the lighting attachment 110 onto the front and rear faces of the flag 70.

A finial attachment 50 may be joined to the top end 62 of the flagpole 60. The finial 50 has a housing 52 and may include a globe 54 removably received in the finial housing 52. A second light source 58 (see FIG. 12) may be disposed in or on the housing 112 or the finial housing 52 that is operatively connected to the energy accumulator 34 to power the second light source 58 to illuminate the globe portion 54 of the finial attachment 50.

Figure 13:
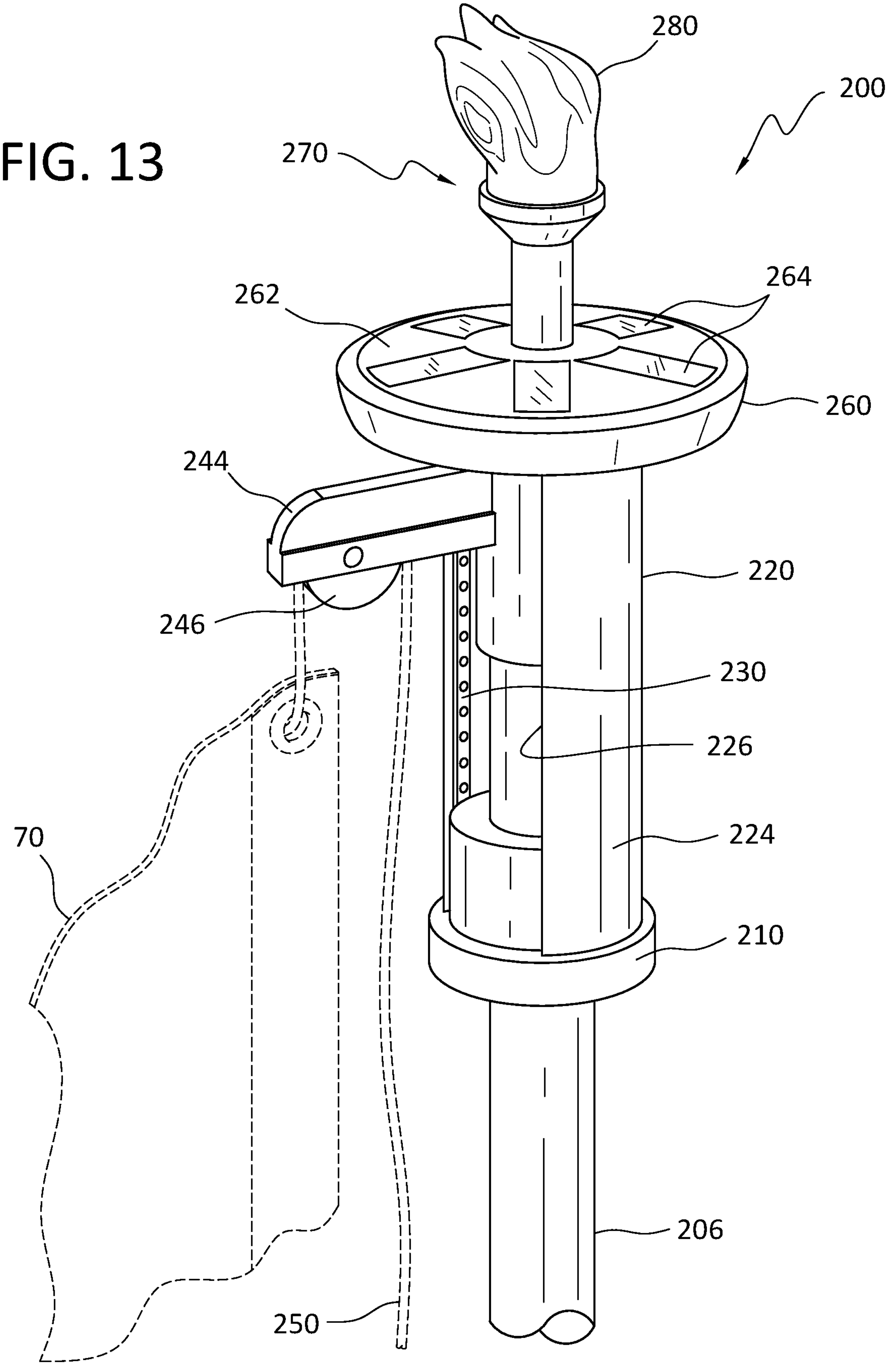
FIG. 13 is a front perspective view of a rotatable flaglight torch with finial that is attached to a flagpole according to a third embodiment of the invention.
Figure 14:
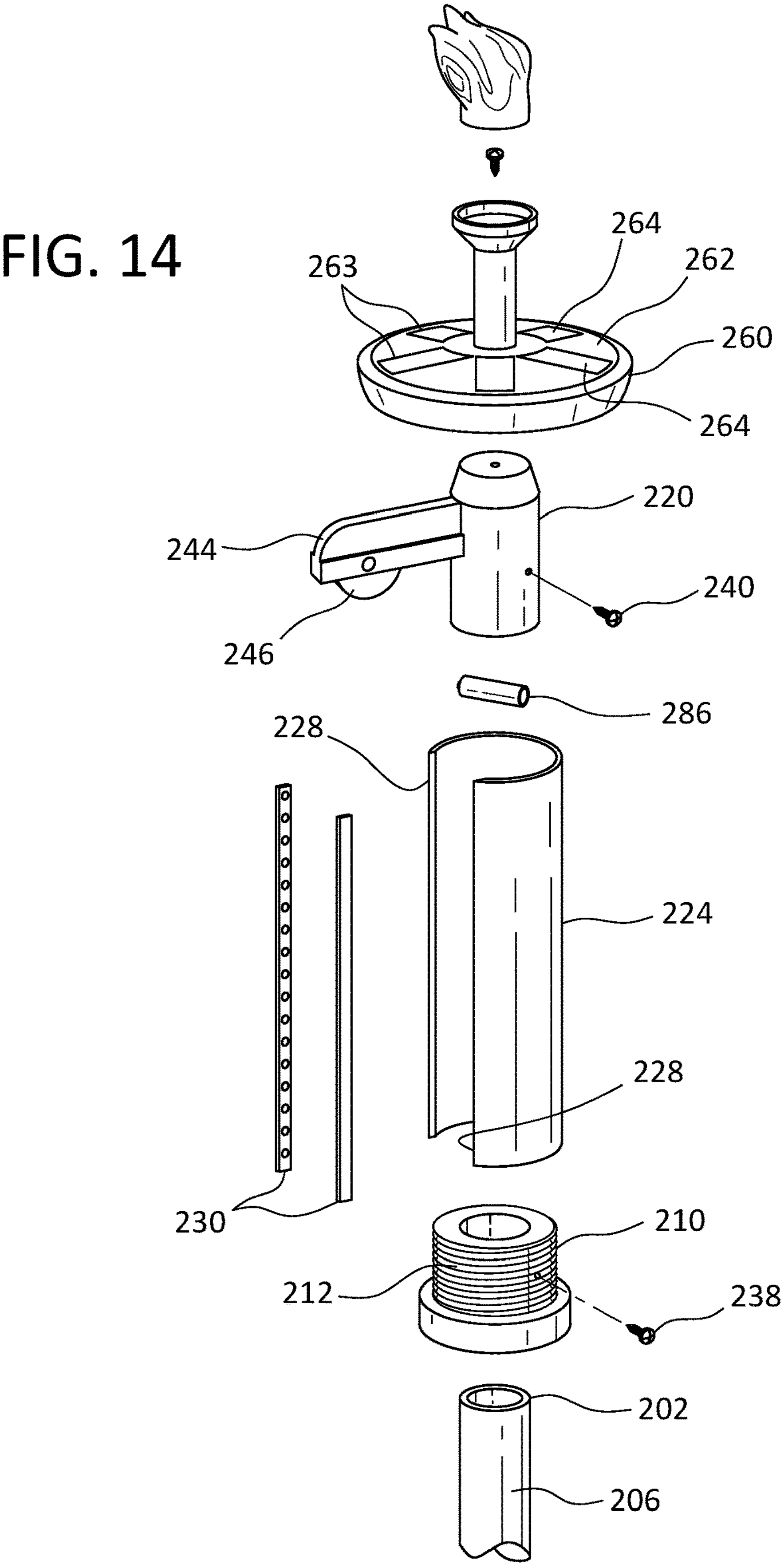
FIG. 14 is an exploded view of the rotatable flaglight torch with finial of FIG. 13.

In a third embodiment of the present invention shown in FIGS. 13 and 14, a lighting attachment 200 for a flagpole 60 has a swivel connector 210 fastened to a top end 202 of the flagpole 206. The swivel connector 210 seats around the flagpole 206 and defines a portion that is rotatable about a central axis, which axis coincides or substantially coincides with the axis defined by the flagpole 206. The swivel connector 210 has a threaded outer wall 212 configured for connection to a lower lighting unit 220.

For the third embodiment, the lower lighting unit 220 is engaged around a vertically mounted flagpole 206 with a portion of the lower lighting unit 220 seated in the swivel connector 210. The lower lighting unit 220 may be slid over the top end portion 202 of the flagpole 206, and when seated in the swivel connector 210, the lower lighting unit 220 is rotatable about the flagpole axis. The lower lighting unit 220 may be formed from a tubular sleeve 224, with a portion cut out from the sleeve sidewall to form a channel or window opening 226 in the tubular sleeve 224. The lower lighting unit 220 has one or more lighting sources 230 secured thereto to direct light radially away from the flagpole 206. In an advantageous embodiment, the lighting sources 230 are LED light strips or tapes, and the LED light strips or tapes are secured inside the tubular sleeve 224 or on the edges 228 of the channel or window opening of the tubular sleeve 224.

A revolving truck 240 is seated for rotation over a top end 202 of the flagpole 206 and is connected by fastener(s) 248 to the tubular sleeve 224 of the lower lighting unit 220. The revolving truck 240 has a portion thereof held inside the lower lighting unit 220. The revolving truck 240 has a cantilevered arm portion 244 extending outwardly and extending outside of the lower lighting unit 220. A pulley 246 is engaged to the cantilevered arm portion 244 of the revolving truck 240. The pulley 246 is configured to receive a halyard 250 for a flag 70 to be flown from the flagpole 206. Both the lower lighting unit 220 and the revolving truck 240 rotate about the tube axis of the tubular sleeve 224. Because these structures 220, 240 are joined by fasteners, their rotation is coordinated together.

In a particularly advantageous implementation of the third embodiment, a finial attachment 260 is joined to the top end 202 of the flagpole 206. A collar extension 266 depends from the finial attachment 260 to seat over the top end 202 of the flagpole 206. The finial attachment 260 comprises at least one compartment 263 in its top surface 262 (see FIG. 14) to support a solar power source 264, such as one or more solar panels 264 and one or more energy accumulators or batteries 286. In one configuration as shown (see FIGS. 13 and 14), the solar panels 264 are arranged on the top surface 262 in a circular array, such as splayed radially away from a central opening in the finial attachment 260.

The energy accumulator 286 is operatively connected to the solar panels 264 and to the one or more lighting sources 230. The lighting sources 230 may comprise one or more LED light strips or tapes. The one or more lighting sources 230 direct light radially away from the flagpole 206, and away from the lower lighting unit 220 to illuminate at least a portion of the flag 70 flown from the flagpole 206. In addition, an ornament or finial 270 (flag topper) is joined to the finial attachment 260. The finial attachment 260 caps over the lower lighting unit 220, and the finial 270 shown in FIGS. 13 and 14 has a globe 280 that is removably fitted into the top of the finial attachment 260. The finial 270 may incorporate a light emitter 282, such as a bulb or one or more LED lighting sources. The energy accumulators 286 or batteries may power both the LED lighting sources 230 of the lower lighting unit 220 as well as the light emitter 282 of the finial 270. Alternatively, the LED light sources may be powered by electricity from another source, such as via electrical connection to a building's electricity.

A flag 70 is secured to the halyard 250 of the third embodiment of the invention, such as by clips, and the halyard 250 operatively connects to the pulley 246. The flag 70 may be raised by pulling on one side of the halyard cord or rope 250, placing the flag 70 adjacent to the lower lighting unit 220. As the lower lighting unit 220 rotates or swivels about the flagpole, the flag 70 tracks this same movement due to its halyard 250 connection to the revolving truck 240 and the revolving truck 240 connection to the lower lighting unit 220. The lighting sources 230 (such as LED tapes or strips) direct light radially away from the lower lighting unit 220 and onto the flag 70. The lighting source(s) in the finial attachment 260 transmit light to the globe 280 of the finial 270.

Figure 15:
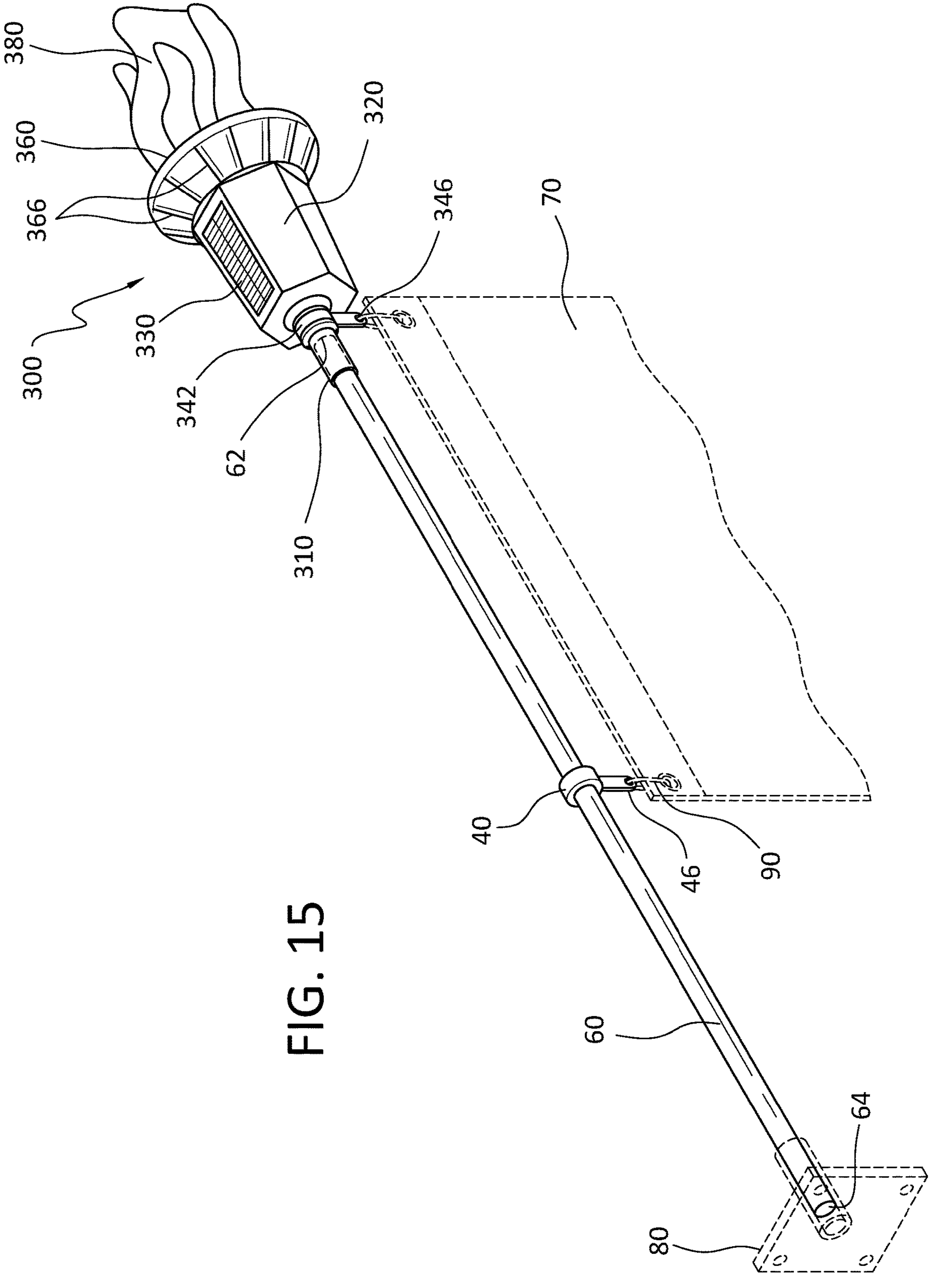
FIG. 15 is a bottom perspective view of a flag lighting attachment for a flagpole according to a fourth embodiment of the invention in combination with a flagpole.
Figure 17:
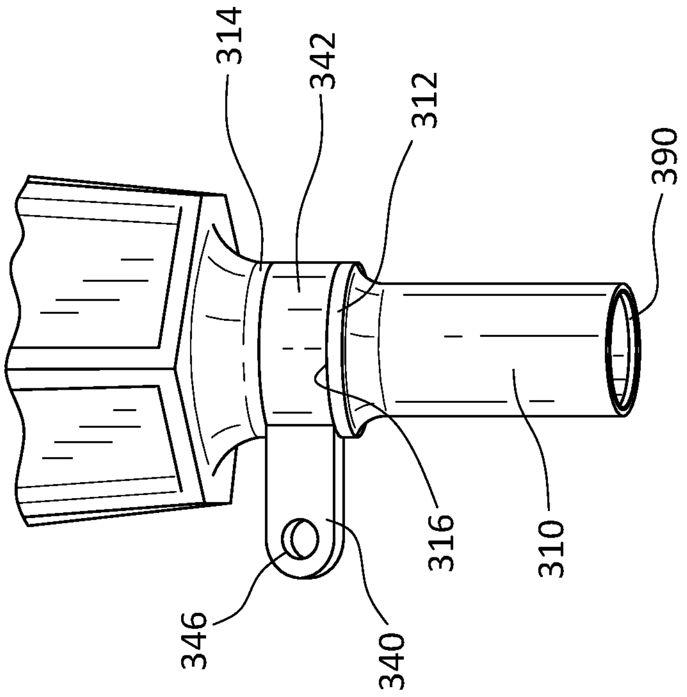
FIG. 17 is a detail view of the elongated sleeve of the finial of FIG. 16.
Figure 16:
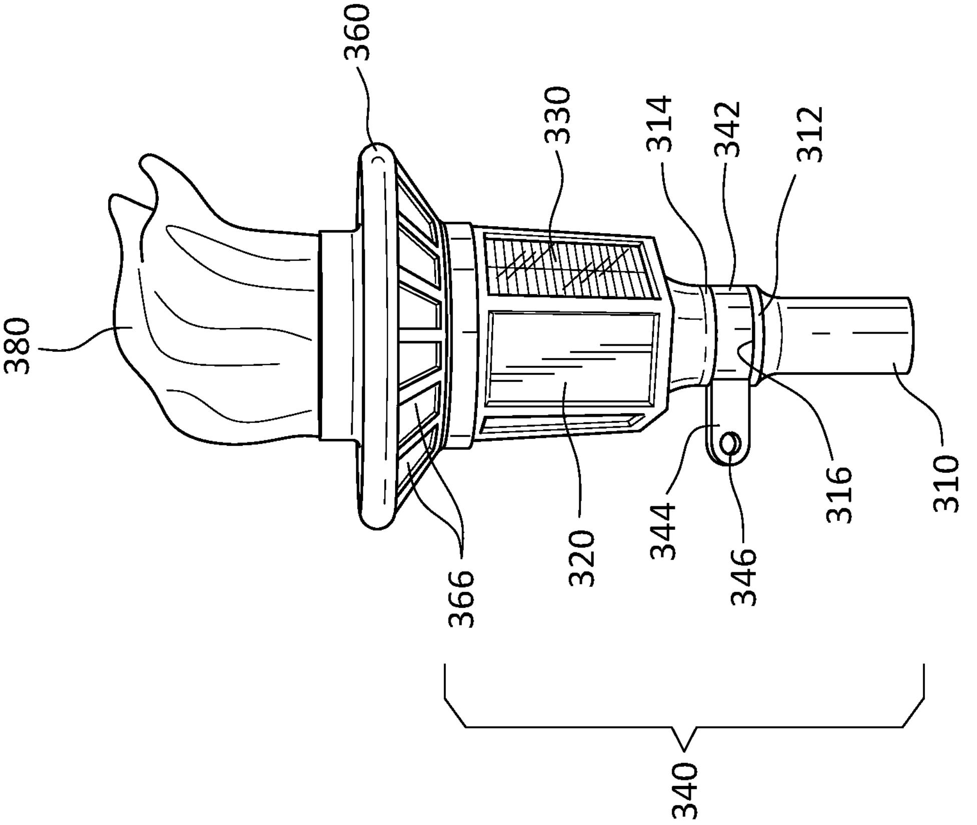
FIG. 16 is a front view of a finial of the flag lighting attachment of FIG. 15.

Referring next to FIGS. 15-17, in a fourth embodiment of the present invention a lighting attachment 300 for a flagpole 60 has a finial attachment 340 and a globe 380. The flagpole 60 is to be mounted to a bracket 80 that is joined to a wall or column surface so that a flag 70 joined to the flagpole 60 may drape downwardly from the flagpole 60. The finial attachment 340 has a housing 320 and a sleeve 310 depending from the housing 320. The sleeve 310 is configured to be removably joined to the top end 62 of the flagpole 60. The sleeve 310 may be tubular, and a portion of the inside wall of such tubular sleeve 310 may include gasket material 390 (see FIG. 17) to frictionally engage with an outside surface of the portion of the flagpole 60 received in the tubular channel of the sleeve 310. The top end 62 of the flagpole 60 may be removably inserted into the sleeve 310. Optionally, the inside wall of the sleeve 310 is provided with screw threads to engage with a threaded outer wall of a flagpole 60 if the flagpole has a threaded outer wall.

The outer wall of the sleeve 310 defines an outer groove 316 (see FIGS. 16 and 17) that is disposed between raised ridges or outwardly projecting walls 312, 314. The groove 316 is configured to receive a revolving flag bracket 342. The revolving flag bracket 342 is rotatably held within the outer groove 316 of the sleeve 310. Preferably, the revolving flag bracket 342 is assembled together with the finial attachment 340 as a unit.

A flag 70 to be suspended from the flagpole 60 is joined to the revolving flag bracket 342, and to a second revolving flag bracket 40 that is appended to the flagpole 60 at a location suitably spaced from the lighting attachment 300. The flag 70 thereby can rotate about the tubular sleeve 310 as well as the flagpole 60 to which the tubular sleeve 310 of the finial attachment 340 is joined. The groove 316 in the sleeve 310 retains the revolving flag bracket 342 so that the revolving flag bracket 342 does not slide down the sleeve 310 or down the flagpole 60, and does not separate from the sleeve 310 of the lighting attachment 300. Other than rotation about the sleeve 310 the relative position of the revolving flag bracket 342 is maintained with reference to the lighting attachment 300. Stated differently, the revolving flag bracket 342 is maintained at a suitable spacing distance from the top of the finial attachment 340 and with reference to the flag 70 secured to the opening 346 in the extended arm 344 of the revolving flag bracket 342.

The lighting attachment 300 shown in FIGS. 15-17 further includes a globe 380 that extends from and is supported by the finial attachment 340. The globe 380 may be formed of a clear or translucent polymeric material or possibly of glass so that such globe 380 emits light therefrom. One or more LED lighting sources to illuminate the globe 380 may be held within the housing 320 of the finial attachment 340.

Alternatively one or more LED lighting sources to illuminate the globe 380 may be held in an LED light housing 360 appended to or integrally formed with the housing 320.

In the embodiment shown in FIG. 16, an LED light housing 360 is mounted at the top of the finial attachment 340. The LED light housing 360 defines window openings 366 that face downwardly toward the housing 320 of the finial attachment 340 and toward the flagpole 60 to which the finial attachment 340 is joined. When the LED light housing 360 is used, and when such LED light housing 360 has window openings 366, light emitting from the globe 380 may also pass through such window openings 366 and partially illuminate the flag 70.

A bottom portion of the globe 380 is held in a channel formed in the LED light housing 360 or alternatively formed in the housing 320 of the finial attachment 340. The globe 380 shown in FIGS. 15-17 is shaped to resemble a torch flame. Other configurations or shapes of globes may be accommodated in the lighting attachment as desired.

In the fourth embodiment of the present invention, the housing 320 of the finial attachment 340 has at least one compartment in an outer wall to support a solar power source 330, such as one solar panel or an array of solar panels. The solar panel(s) 330 are operatively connected to at least one energy accumulator, such as a battery, and the energy accumulator in turn is operatively connected to the one or more LED lighting sources. The energy accumulator may be held within the housing 320.

The lighting attachment 300 comprising the finial attachment 340 and the globe 380, or comprising the finial attachment 340, globe 380 and LED light housing 360, provides unique lighting effects when installed on a flagpole 60. The globe 380 when lit provides light comparable to a porch light or other outdoor home yard lighting, and thereby can direct light where desired by installing the lighting attachment 300 onto a flagpole 60 and securing the bottom end 64 of the flagpole 60 into a mounting bracket 80 that has been secured to a mounting surface. The globe 380 extends away from the top end 62 of the flagpole 60, thus directing light to a location that is spaced apart from the mounting surface onto which the bracket 80 is supported. Moreover, because the revolving flag bracket 342 is a component of the lighting attachment 300 in this embodiment of the present invention, the flag 70 connected to the revolving flag bracket 342 thereby stays appropriately spaced from the globe 380, while the flag 70 is permitted to move in response to wind gusts with the revolving bracket 342 and the companion revolving bracket 40 about the flagpole 60. The revolving flag bracket 342 is held for rotation within the groove 316 of the sleeve 310 and thereby keeps the flag 70 in at the desired spacing distance from the globe 380.

In the various embodiments of the lighting attachments 10, 110, 200, 300 according to the present invention, a light sensor may be deployed in conjunction therewith to sense ambient light levels and activate a switch associated with the one or more LED lighting sources. For example, the light sensor can be set to activate the switch for the LED lighting sources in dusk or nighttime conditions to illuminate the globes and/or the flag that is supported by the flagpole to which the lighting attachment is appended. Optionally, in addition, the light sensor can be set to deactivate the switch to the LED lighting sources in daylight conditions.

Additional objectives, advantages, features and application possibilities of the present invention ensue from the description of embodiments making reference to the drawings. In this context, all of the described and/or depicted features, either on their own or in any meaningful combination, constitute the subject matter of the present invention, also irrespective of their compilation in the claims or the claims to which they refer back.

The invention claimed is:

1. A lighting attachment for a flagpole, comprising:

a housing having a top and a bottom, said housing defining an inner channel configured to receive a portion of a length of the flagpole;

a reflector seated in the housing or arranged on the top of the housing, said reflector having a first concavely dished surface and a second concavely dished surface and a center surface between the first concavely dished surface and the second concavely dished surface, with the first concavely dished surface disposed to one side of the flagpole and the second concavely dished surface disposed to another side of the flagpole when the flagpole is received in the housing; and at least one light source disposed on a surface of the reflector and directing light toward the center surface of the reflector.

2. The lighting attachment of claim 1, further comprising a finial attachment configured to be joined to the top of the flagpole.

3. The lighting attachment of claim 2, further comprising at least one solar panel disposed on the top of the housing and operatively connected with an energy accumulator to power the at least one light source.

4. The lighting attachment of claim 3, further comprising a second light source disposed in or on the housing that is operatively connected to the energy accumulator to power a second light source to illuminate a globe portion of the finial attachment.

5. The lighting attachment of claim 1, further comprising a first revolving bracket joined to the flagpole below a bottom end of the housing and a second revolving bracket joined to the flagpole at a distance spaced apart from the first revolving bracket, wherein said revolving brackets are connectable to a flag either directly, or alternatively indirectly, with fasteners.

6. The lighting attachment of claim 5, wherein the second revolving bracket is disposed between a top end of the housing and a finial attachment configured to be joined to the top of the flagpole.

7. The lighting attachment of claim 1, wherein the reflector directs light away from the flagpole and onto a front face and a rear face of a flag suspended from the flagpole.

8. The lighting attachment of claim 1, wherein the first concavely dished surface comprises a parabolic reflector and wherein the second concavely dished surface comprises a second parabolic reflector.

9. A lighting attachment for a flagpole, comprising:

a housing having a top and a bottom, said housing defining an inner channel configured to receive a portion of a length of the flagpole, said housing having a window opening in its bottom;

a lens disposed over the window opening;

a sleeve defining an inner channel configured to receive a portion of a length of the flagpole, said sleeve having an upper end and a lower end, wherein said lower end is attached to or integrally formed with a revolving flag bracket, and wherein said upper end is rotatably held within the housing, with said upper end defining an opening through a sidewall of the sleeve;

a reflector seated in the sleeve and arranged for directing light out of the sleeve through the opening and through the lens of the window opening; and at least one light source disposed on a surface of the reflector or on a surface of the flagpole within the sleeve;

wherein said sleeve is rotatable relative to the flagpole in response to movement of a flag attached to the revolving flag bracket.

10. The lighting attachment of claim 9, further comprising at least one solar panel disposed on the top of the housing and operatively connected with an energy accumulator to power the at least one light source.

11. The lighting attachment of claim 9, further comprising a second revolving flag bracket joined to the flagpole and spaced a distance apart from the revolving flag bracket.

12. The lighting attachment of claim 11, wherein the second revolving flag bracket is positioned above the top of the housing, and wherein said revolving brackets are connectable to a flag either directly, or alternatively indirectly, with fasteners.

13. The lighting attachment of claim 9, wherein said sleeve is rotatable within said housing, and said housing does not rotate about the flagpole.

14. The lighting attachment of claim 9, wherein the reflector directs light away from the flagpole and onto a front face and a rear face of a flag suspended from the flagpole.

15. The lighting attachment of claim 9, further comprising a finial attachment configured to be joined to the top of the flagpole.

16. The lighting attachment of claim 9, further comprising a finial attachment configured to be joined to the top of the flagpole; and a second light source disposed in or on the housing that is operatively connected to the energy accumulator to power a second light source to illuminate a globe portion of the finial attachment.

17. A lighting attachment for a flagpole, comprising:

a finial attachment having a housing and having a sleeve depending from the housing, wherein said sleeve is configured to be removably joined to the top of the flagpole, said flagpole defining a flagpole axis, and wherein said sleeve has an outer circumferential surface and defines an outer groove in and around the circumferential surface that is configured to receive a revolving flag bracket adapted for rotational movement about the axis of the flagpole within the outer groove;

a globe supported by the finial attachment, said globe extending upwardly above and away from the top of the flagpole; and one or more LED lighting sources to illuminate the globe.

18. The lighting attachment of claim 17, wherein said housing comprises at least one compartment to support a solar power source.

19. The lighting attachment of claim 18, wherein the solar power source comprises at least one solar panel operatively connected to at least one energy accumulator, and wherein the energy accumulator is operatively connected to the one or more LED lighting sources.

20. The lighting attachment of claim 19, wherein the at least one energy accumulator is disposed within the housing.

21. The lighting attachment of claim 17, further comprising the revolving flag bracket rotatably held within the outer groove.

22. The lighting attachment of claim 17, wherein the sleeve defines a tubular channel and a gasket is provided inside the tubular channel to engage with a portion of an outer wall portion of a flagpole received in the tubular channel.

23. A lighting attachment for a flagpole, comprising:

a swivel connector fastened to the flagpole, said swivel connector defining a portion that is rotatable about a central axis defined by the flagpole;

a lower lighting unit slidably and rotatably engaged around the flagpole with a portion seated in the swivel connector, said lower lighting unit having one or more LED lighting sources secured thereto to direct light radially away from the flagpole;

a revolving truck seated over a top of the flagpole and having a portion thereof inside the lower lighting unit, said revolving truck having a cantilevered portion to which a pulley is engaged, said pulley configured to receive a halyard for a flag to be flown from the flagpole.

24. The lighting attachment of claim 23, further comprising a finial attachment configured to be joined to the top of the flagpole.

25. The lighting attachment of claim 24, wherein the finial attachment comprises at least one compartment to support a solar power source.

26. The lighting attachment of claim 25, wherein the solar power source comprises at least one solar panel operatively connected to at least one energy accumulator.

27. The lighting attachment of claim 26, wherein the energy accumulator is operatively connected to the one or more LED lighting sources.

28. The lighting attachment of claim 23, wherein the one or more LED lighting sources comprise one or more LED light strips or tapes.

29. The lighting attachment of claim 23, wherein the one or more LED lighting sources illuminate at least a portion of the flag flown from the flagpole.

30. The lighting attachment of claim 24, wherein the finial attachment caps over the lower lighting unit.

* * * * *